United States Patent [19]

Simone et al.

[11] Patent Number: 4,640,801

[45] Date of Patent: Feb. 3, 1987

[54] GRAFT POLYOLS

[75] Inventors: Dominic Simone, Lincroft; Melvin Brauer, East Brunswick, both of N.J.

[73] Assignee: CasChem, Inc., Bayonne, N.J.

[21] Appl. No.: 680,705

[22] Filed: Dec. 12, 1984

Related U.S. Application Data

[63] Continuation-in-part of Ser. No. 581,816, Feb. 21, 1984, abandoned.

[51] Int. Cl.$^4$ .................... C08H 5/00; C08F 242/00; C08F 222/20
[52] U.S. Cl. .................... 260/407; 560/116; 560/126; 560/120; 568/816; 568/820; 568/838; 528/74; 528/74.5; 528/75; 528/245.5; 528/246; 528/295.5; 528/298
[58] Field of Search ............... 526/283, 281; 260/407; 525/290, 66, 130, 154; 524/769; 560/116, 120, 126, 128; 568/817, 820, 838, 116; 528/74, 74.5, 75, 245.5, 246

[56] References Cited

U.S. PATENT DOCUMENTS

| | | | |
|---|---|---|---|
| 1,982,707 | 12/1934 | Thomas | 260/2 |
| 2,192,152 | 2/1940 | Rheineck et al. | 260/407 |
| 2,387,895 | 10/1945 | Gerhart | 260/23 |
| 2,390,530 | 12/1945 | Gerhart et al. | 260/23 |
| 2,392,140 | 1/1946 | Gerhart | 260/23 |
| 2,397,600 | 4/1946 | Gerhart | 260/23 |
| 2,398,889 | 4/1946 | Gerhart | 260/23 |
| 2,443,044 | 6/1948 | Lycan et al. | 260/407 |
| 2,601,273 | 6/1952 | Gerhart | 526/283 |
| 2,792,410 | 5/1957 | Mundy | 260/407 |
| 2,822,371 | 2/1958 | Nichols | 260/406 |
| 2,837,546 | 6/1958 | Nichols | 260/407 |
| 4,064,199 | 12/1977 | Nishikawa | 525/290 |
| 4,256,619 | 3/1981 | Miyaguchi | 526/283 |
| 4,330,448 | 5/1982 | Iwata | 526/283 |
| 4,339,367 | 7/1982 | Chino | 525/131 |

OTHER PUBLICATIONS

"Properties and Uses of Dicyclopentadiene and Methylcyclopentadiene Dimer," by Exxon Chemicals.

*Primary Examiner*—C. Warren Ivy
*Attorney, Agent, or Firm*—Pennie & Edmonds

[57] ABSTRACT

Graft polyols comprising the liquid reaction product of a vegetable oil or unsaturated fatty carbon compound having at least eight carbon atoms, at least one hydroxyl group, and at least one double bond, a cyclopentadienyl compound and a terminally unsaturated monomer having at least one hydroxyl group. These liquid low viscosity polyols when cured with a polyisocyanate, melamine, or formaldehyde compound yield high solids or solventless polyurethane compositions useful as coatings, adhesives, potting or molding compounds.

34 Claims, No Drawings

GRAFT POLYOLS

This application is a continuation-in-part of Ser. No 581,816 filed Feb. 21, 1984, now abandoned.

TECHNICAL FIELD

This invention relates to a novel class of graft polyols which are liquids of relatively low viscosity at ambient temperature. These polyols when cured with polyisocyanates, melamine or formaldehyde compounds, or used in the preparation of alkyd resins yield solventless or high solids compositions which are useful as coatings, adhesives and potting or molding compounds.

BACKGROUND ART

Polyols are very well known to those skilled in the art due to their utility as reactants for the preparation of a variety of polymeric or resin compositions. Typical reactions include curing or crosslinking reactions with isocyanate or polyisocyanate materials having at least two isocyanate groups per mole, melamines or formaldehyde compounds.

One class of polyols includes polyester polyols or the hydroxy terminated polyesters. These are generally prepared by an esterification reaction of a diol or mixtures of diols and triols with a dicarboxylic acid or anhydride. Examples of such suitable diols and triols are ethylene glycol, propylene glycol, 1,3 propane diol, 1,4 butane diol, neopentyl glycol, trimethylol propane and the like. Examples of such dicarboxylic acid and anhydrides are phthalic acid, phthalic anhydride, isophthalic acid, maleic acid, maleic anhydride, succinic acid, adipic acid and the like. These polyester polyols, however, are generally high viscosity compounds which, when mixed with a curing or crosslinking agent, have to be diluted or dissolved in relatively large amounts of a suitable solvent in order to provide low viscosity, easy to apply coating compositions.

Because a large amount of solvent is required to reduce the viscosity of these polyols, they are not suitable for the formulation of high solids coatings. Moreover, due to the presence of the solvent, these polyols cannot be used in compounds for potting or molding applications.

Castor oil is a triglyceride ester of ricinoleic acid and contains approximately 3 hydroxyl groups per molecule. It is, therefore, a polyester polyol which can be reacted with isocyanates, polyisocyanate, melamine or formaldehyde compounds. These castor oil compositions, however, have relatively poor mechanical properties and solvent resistance.

A second class of polyols is the acrylic polyols. These are prepared by the copolymerization of a hydroxy acrylate or methacrylate with acrylate and/or methacrylate esters or styrene. Examples of suitable monomers are hydroxyethyl acrylate, hydroxyethyl methacrylate, hydroxyethyl acrylate, hydroxypropyl methacrylate, methyl acrylates, ethyl acrylate, butyl acrylates, 2-ethylhexyl acrylate, methyl methacrylate, butyl methacrylate and the like.

These hydroxy containing acrylic polymers, like the polyester polyols, are high viscosity compounds which, when mixed with the desired curing or crosslinking agent, also require large amounts of solvent to provide low viscosity, easy to apply coating compositions. Again, due to the presence of a large amount of solvent, these polyols are not suitable for the high solids coatings, or for potting and molding applications.

A third class of polyols comprises polyether polyols. These are prepared by the homopolymerization and copolymerization of ethylene oxide and propylene oxide. Although some of the polyols in this class have acceptable viscosity, particularly those with low molecular weights, they are not suitable for high solids coating applications because of their relatively poor physical properties. Specifically, these deficient properties include poor light stability, poor weathering properties, and poor solvent and water resistance.

Cyclopentadiene has been copolymerized with drying and semidrying oils by a process described in U.S. Pat. No 2,390,530 to Gerhart for the purpose of providing inexpensive, solid resin compositions which are suitable as "gums" or resins for ultimate use in paints and varnishes. These oils include linseed oil, soybean oil, perilla oil, oiticica oil, tung oil, cotton oil, palm oil, and sunflower oil. U.S. Pat. No. 2,392,140, also to Gerhart, describes a process for the polymerization of cyclopentadiene either alone or conjointly with an equimolar ratio of a glyceride oil or an ethylenic compound such as indene, coumarone, methyl methacrylate, styrene, or maleic anhydride. The resulting resins, at least while hot, are liquid and can be admixed with additional drying oils, thinners, and the like to obtain a resin paint or varnish of desired viscosity and color.

While the above described resins are useful for certain paint and varnish compositions, they do not contain any hydroxyl groups which can be reacted with a curing or crosslinking agent such as a polyisocyanates, melamines, or formaldehyde compounds to form high solids resin coatings.

DISCLOSURE OF INVENTION

One object of the present invention is to provide novel graft polyols which are liquid and of low viscosity at ambient temperature.

Another object is to provide polyols which when mixed with isocyanate, polyisocyanate, melamine, or formaldehyde components yield high solids coating compositions and adhesives.

A further object is to provide polyols which when mixed with solventless isocyanates or polyisocyanates yield compositions suitable for potting or molding compounds.

Another objective is to provide polyols which when mixed with isocyanates, polyisocyanates, melamine, or formaldehyde compounds yield compositions which have outstanding physical properties, solvent resistance, and weathering properties.

The novel graft polyols of the present invention comprise a three component liquid reaction product: at least one vegetable oil or fatty alcohol having at least 8 carbon atoms, at least one liquid cyclopentadienyl compound; and at least one terminally unsaturated monomer having at least one hydroxyl group. Generally a copolymer of the cyclopentadienyl compound and terminally unsaturated hydroxyl monomer is grafted to the vegetable oil or fatty alcohol by the methods described hereinbelow.

The vegetable oils useful in this invention include chinawood oil, soybean oil, dehydrated castor oil, sunflower oil, cotton oil, safflower oil, perilla oil and others containing substantial quantities of synthetic or natural unsaturated glycerides of drying oil acids or the corresponding esters of sorbitol, pentaerythritol, or other similar polyhydric alcohol polyesters of drying oil acids. Also, mixtures of such oils may be used.

Similarly, synthetic triglycerides, i.e., those obtained from the ring opening of partially epoxidized vegetable oils, are suitable. These synthetic materials would have an economic disadvantage, however, when compared to other vegetable oil components which are readily available and relatively inexpensive.

Another group of compounds which are included in the classification of vegetable oils in this invention are the glycerides of unsaturated hydroxy fatty acids having from eight to eighteen carbon atoms, at least one double bond and at least one hydroxyl group. A preferred triglyceride of an unsaturated hydroxy fatty acid is castor oil which consists principally of triglycerides of ricinoleic acid (an 18 carbon acid having a double bond in the 9-10 position and a hydroxyl group on the 12th carbon). Also, the triglycerides of this class may also contain other functional groups or nonreactive components.

A second class of compounds which can be used in place of or along with the above-described vegetable oils includes unsaturated fatty carbon compounds having at least one hydroxyl group. This group would include monoesters and diesters of fatty acids having at least eight carbon atoms and at least one double bond. Specific examples include ethylene glycol monoricinoleate, butane diol diricinoleates, fatty alcohols having eight or more carbon atoms, or polyhydric alcohols having at least one double bond. This group would also include the dimer or trimer fatty acid diols.

The liquid cyclopentadienyl compounds which are suitable in the preparation of the graft polyols of the present invention include cyclopentadiene, methyl cyclopentadiene, dicyclopentadiene, methyl cyclopentadiene dimer, their mixtures and their low molecular weight polymers and copolymers, such as trimers, tetramers, pentamers, etc. At the graft polymerization temperatures used in the process of preparing the polyols of the present invention, the dimers, trimers, tetramers and the low molecular weight polymers and copolymers of cyclopentadiene and methyl cyclopentadiene depolymerize first and then copolymerize to form the desired polyols.

Suitable terminally unsaturated hydroxyl monomers include those compounds which terminate with the structural formula

$CH_2=C<$ or $CHCH_3=C<$

Specifically, compounds such as allyl alcohol and the acrylic, methacrylic and crotonic acid mono-esters of ethylene glycol, propylene glycol, 1-4 butanediol, 1-6 hexanediol, 2,2 dimethyl-1,3-propanediol, 1-4 cyclohexane dimethanol, diethylene glycol, triethylene glycol, dipropylene glycol, and tripropylene glycol are preferred.

When unsaturated, non-hydroxy fatty acid triglycerides are used, the amount of terminally unsaturated hydroxyl monomer should be increased proportionally. Again, however, since these monomers are generally much more expensive than the triglycerides, this presents an economic disadvantage.

In a preferred embodiment of the invention, these graft polyols are comprised of castor oil, dicyclopentadiene, and hydroxyethyl methacrylate. Similar advantageous results are achieved when hydroxyethyl methacrylate is substituted with hydroxyethyl acrylate or allyl alcohol.

The amount of each component is not critical to the preparation of the graft polyols of the invention provided that a sufficient amount of each component is present. Since the economics favor the vegetable oil, it usually constitutes the primary component, and ranges from about 40 to 90 weight percent of the overall graft polyol composition. The cyclopentadienyl compound can range from about 5 to 55 weight percent, and the terminally unsaturated hydroxyl monomer content can range from about 1 to 25 weight percent. The examples further disclose certain compositions which produce particularly advantageous graft polyols.

The presence of a terminally unsaturated hydroxyl monomer has two functions: it increases the hydroxy functionality and controls its molecular weight and viscosity of the final product. It was found that without these momomers, it is difficult to produce a final polyol product having the desired viscosity and molecular weight.

Certain graft polyol products of the present invention, have drying properties and may be cured to hard films in the presence of drying catalysts such as lead, cobalt, or calcium napthanates and the like, either at room temperature or by baking at 100°-150° C.

Urethane compositions having enhanced mechanical properties and solvent resistance can be obtained when any polyols according to the invention are cured by reaction with an isocyanate or polyisocyante compound and by polymerization induced by drying catalysts at room temperature or by baking at 100°-150° C.

The high molecular weight, high viscosity polyols have a high degree of tack and can be used to impart tack and strength to adhesives and aid to increase the hard resin loading of the same.

The graft polyols of this invention, either alone or in mixtures with other graft or conventional polyols, can be used to formulate high solids urethane and melamine resin compositions which are useful as maintenance, industrial, marine, machinery and appliance coatings. Additionally, these polyols can be used either alone or in combination with other solventless polyols to produce polyurethane compositions which are useful as potting, molding, encapsulation, reactive tack resins, grommets, tires, belts and a variety of other commercial articles.

In order to prepare the novel polyols of the present invention, the components are charged into an autoclave or other pressure reactor. This mixture is then preheated to about 50°-150° C., preferably under nitrogen sparging and/or agitation. After nitrogen sparging is completed, the pressure reactor is closed, and the temperature is raised to about 250°-275° C. The reaction is then allowed to proceed for a sufficient time period (normally between about 3 to 5 hours) at the corresponding reaction pressure, again utilizing nitrogen sparging and/or agitation, if desired. At the end of this period the pressure vessel is vented to remove any unreacted monomer and cooled to about room temperature.

Another, and in some cases the preferred method, is that of pre-heating the vegetable oil or fatty alcohol in the pressure reactor at the polymerization temperature, before injecting the other components. The addition of these other components in this case can be done continuously or by aliquots of each component separately or mixed together. In each case the temperature of the reactants should not be allowed to drop below about 250° C. After preheating the vegetable oil or fatty alcohol, it may be desirable to use nitrogen sparging and/or agitation to remove air from the system before adding the other components.

The preferred polymerization temperature is about 265±5° C. Lower temperatures generally yield products which are cloudy or even wax-like. Higher temperatures yield products which are darker in color, particularly if nitrogen sparging of the reactor is omitted. These products, however, may be suitable for certain applications.

The examples of this application disclose the reactants and their compositions along with the temperatures and reaction times which are advantageous for graft polyols prepared from specific components or reactants. For other reactants, these variables may be slightly different, but are easily ascertainable by those skilled in the art by routine experimentation.

EXAMPLES

Examples: The scope of the invention is further described in connection with the following examples which are set forth for purposes of illustration only and are not to be construed as limiting the scope of the invention in any manner.

EXAMPPLE 1

A one liter pressure reactor was charged with 450 grams of castor oil. The oil was heated to 150° C. with stirring and nitrogen sparging and held for 30 minutes. At the end of this period, 157.5 grams of dicyclopentadiene and 67.5 grams of hydroxyethyl methacrylate were charged into the reactor. The composition of the charged materials was: 66.67% by weight of castor oil, 23.33% of dicyclopentadiene and 10% of hydroxy ethyl methacrylate. The nitrogen sparging was discontinued. The reactor was closed and the temperature raised to 265° C. The pressure in the reactor reached a maximum of 80 psi at 240° C. At this temperature the monocyclopentadiene generated by the cracking of the dicyclopentadiene started to copolymerize with the hydroxyethyl methacrylate and the castor oil and the pressure in the reactor started to decrease even though the temperature was increasing. After a 3 hour reaction at 265° C., the pressure decreased to 24 psi and then remained constant, while the reaction was continued for an additional hour. The reactor was vented for a few minutes, closed, and then cooled to about 200° C. A vacuum of 50 mm. was applied for 30 minutes to distill the unreacted monomers. A 2.5 gram sample of an amber colored liquid was collected in the vacuum trap, and it indicated a product yield of 99.6%. The vacuum was discontinued. The product cooled to about room temperature and discharged from the reactor. The product was a clear, liquid having a viscosity of 10,800 cps at 25° C., an acid value of 3, an OH value of 140.4, and an iodine value of 119.3.

EXAMPLE 2

Using the same procedure as described in Example 1, 300 grams of castor oil was reacted with 87 grams of dicyclopentadiene and 63 grams of hydroxyethyl methacrylate. The composition of the charged material in this case was: 66.67% of castor oil, 19.33% of dicyclopentadiene and 14% of the hydroxyethyl methacrylate. The reaction product was a liquid containing some suspended polymer particles. These particles, however, were easily removed by filtering the product through a 100 mesh screen. The clear, filtered product had a viscosity of 9,260 cps at 25° C., an acid value of 1.7, an OH value of 154.7 and an iodine value of 116.3.

EXAMPLE 3

Using the procedure as described in Example 1, 300 grams of castor oil was reacted with 93 grams dicyclopentadiene and 57 grams of hydroxyethyl acrylate. The composition of the charged materials was: 66.67% of castor oil, 20.66% of dicyclopentadiene, and 12.67% of hydroxyethyl acrylate. The reaction product was a liquid containing, in suspension, some polymer particles. After filtration through a 100 mesh screen, the clear, final product had a viscosity of 4,560 cps at 25° C., an acid value of 1.4, an OH value of 155, and an iodine value of 109.6.

EXAMPLE 4

Using the procedure as described in Example 1, 300 grams of castor oil was reacted with 121.5 grams of dicyclopentadiene and 28.5 grams of allyl alcohol. The composition of the charged materials was: 66.67% of castor oil, 27% of dicyclopentadiene and 6.33% of allyl alcohol. In this case, because of the low boiling point of the allyl alcohol, the dicyclopentadiene and the allyl alcohol were added into the reactor at a temperature of 80° C. The product of the reaction was a clear liquid which did not require any filtration. The product had a viscosity of 8,280 cps at 25° C., an acid value of 1.9, an OH value of 150, and an iodine value of 150. The ratio of castor oil to dicyclopentadiene and hydroxy monomer in Examples 1–4 was kept constant at 2:1. The ratio of dicyclopentadiene to hydroxy monomer was calculated so that the final products would have essentially the same OH value and equivalent weight.

EXAMPLE 5

To illustrate the usefulness of the hydroxy monomers in controlling and reducing the viscosity of the final products, 300 grams of castor oil was reacted with 150 grams of dicyclopentadiene according to the procedure described in the Example 1.

The product in this case was a clear liquid having a viscosity of 291,200 cps, an acid value of 1.8, an OH value of 101, and an iodine value of 142. This product was too viscous to be considered as a useful material for the high solid coatings, however, it had very good tackifying and air drying properties.

EXAMPLE 6

To illustrate the usefulness of the dicyclopentadiene in the grafting reaction of vinyl monomers onto the castor oil, 300 grams of castor oil were reacted with 63 grams of hydroxyethyl methacrylate according to the procedure described in Example 1. The final product was a mixture of liquid and solid materials. The liquid material was unmodified castor oil containing some polymer particles in suspension. The solid material which formed or precipitated on the reactor walls, stirrer, and thermometer well was poly hydroxyethyl methacrylate.

EXAMPLE 7

To illustrate the effect of the reaction temperature on the final product, the reaction of Example 1 was repeated, except that the reaction temperature was 230° C. instead of 265° C. The product was a very cloudy liquid which could not be filtered. It had a viscosity of 2,800 cps at 25° C., an acid value of 1.1, an OH value of 152.4, and an iodine value of 112.1.

EXAMPLE 8

The reaction in Example 1 was repeated except that in this case, the temperature was 240° C. The product was cloudy and could not be filtered. It had a viscosity of 5,300 cps at 25° C., an acid value of 1.1, an OH value of 151.1, and an iodine value of 106.7.

EXAMPLE 9

The reaction of Example 1 was repeated except that, in this case, the temperature was 250° C. Again the product was slightly cloudy and was difficult to filter. It had a viscosity of 3,700 cps at 25° C., an acid value of 1.1, an OH value of 148.1, and an iodine value of 109.5.

EXAMPLES 7-9 support the disclosure that a reaction temperature range of 250°-275° C. (preferably 265° C. as in Example 1) must be used in order to prepare a clear product which does not need any filtration.

EXAMPLE 10

Using the same procedure as described in Example 1, 450 grams of castor oil was reacted with 174 grams of dicyclopentadiene and 51 grams of allyl alcohol. The dicyclopentadiene and the allyl alcohol were added to the castor oil in the reactor at a temperature of 75° C. The composition of the reactant materials was: 66.67% of castor oil, 25.78% of dicyclopentadiene, and 7.55% of allyl alcohol. The product was a clear liquid which did not require any filtration. It had a viscosity of 4,600 cps at 25° C., an acid value of 2.2, an OH value of 168.6, and an iodine value of 121.1.

EXAMPLE 11

Using the same procedure as described in Example 1, 335 grams of castor oil were reacted with 259 grams of dicyclopentadiene and 76 grams of allyl alcohol. The dicyclopentadiene and the allyl alcohol were added to the castor oil at a temperature of 75° C. The composition of the reactant materials was 50% of castor oil, 38.67% of dicyclopentadiene, and 11.33% of allyl alcohol. The product was a clear material and did not require any filtration. It had a viscosity of 32,500 cps at 25° C., an acid value of 2.0, an OH value of 172.7, and an iodine value of 138.2.

EXAMPLE 12

Using the same procedure as described in Example 1, 335 grams of castor oil was reacted with 232.2 grams of dicyclopentadiene, and 102.2 grams of allyl alcohol. The dicyclopentadiene and the allyl alcohol were added to the castor oil at a temperature of 75° C. The composition of the reactants was: 50% of castor oil, 34.75% of dicyclopentadiene, and 15.25% of allyl alcohol. The product was a clear liquid which did not require any filtration. It had a viscosity of 9,040 at 25° C., an acid value of 2.2, an OH value of 203, and an iodine value of 128.5.

EXAMPLE 13

A one liter pressure reactor was charged with 520 grams of the castor oil. The oil was heated to 265° C. with stirring and nitrogen sparging and held for 15 minutes at that temperature. At the end of this period the nitrogen sparging was discontinued and the reactor closed. A mixture containing 176 grams of the dicyclopentadiene and 104 grams of the hydroxyethyl acrylate was prepared. The composition of the reactants was: 65% of castor oil, 22% of dicyclopentadiene, and 13% of hydroxyethyl acrylate. A 93.3 gram aliquot of this mixture was pumped into the reactor. The temperature dropped initially to 250° C. and then again started to increase. When the temperature reached 265° C., a second aliquot of 93.3 grams of the dicyclopentadiene/hydroxyethyl acrylate mixture was pumped into the reactor. Again the temperature dropped to about 250° C. and then started to increase. When the temperature reached 265° C., the remaining 93.4 grams of the dicyclopentadiene hydroxyethyl acrylate mixture was added. The temperature was raised to 265° C. and kept constant for 4 hours. At the end of this period the reactor was vented for a few minutes, closed, and then cooled to about 200° C. A vacuum of about 50 mm was applied for 30 minutes to distill the unreacted monomers. The vacuum was discontinued and the product cooled to room temperature. The product was a clear liquid and did not require filtration. It had a viscosity of 5,620 cps at 24° C., an acid value of 3.6, an OH value of 153.6, and an iodine value of 109.8.

EXAMPLE 14

The experiment as described in Example 13 was repeated. Again the product was a clear liquid and did not need to be filtered. It had a viscosity of 5,910 at 26° C., an acid value of 3.3, an OH value of 149.9, and an iodine value of 113.9.

EXAMPLE 15

A one liter pressure reactor was charged with 357 grams of soybean oil, 238 grams of dicyclopentadiene and 105 grams of allyl alcohol. The mixture was heated to 265° C. and was held at this temperature for approximately 4 hours. The reactor was vented and allowed to cool to room temperature. The resulting material was a clear liquid having a viscosity of 2,010 cps at 23° C., an acid value of 1.4, an OH value of 140.5, and an iodine value of 143.2.

EXAMPLE 16

The experiment described in Example 15 was repeated, except that 357 grams of cottonseed oil was used instead of soybean oil. Again, the product was a clear liquid which did not require filtration. It had a viscosity of 1940 cps at 21° C., an acid value of 1.0, an OH value of 131.6 and an iodine value of 142.5.

EXAMPLE 17

The reactor of Example 14 was charged this time with a fatty alcohol produced by Emery Chemicals, Cincinnati, Ohio, Emery 2873, having an OH value of 97, an equivalent weight of 578.4, a functionality of between 2 and 3, and an iodine value of 97.7, in an amount of 455 grams (65% of the mixture). To the Emery 2873 was added 182 grams (26%) of dicyclopentadiene and 63 grams of allyl alcohol. The mixture was heated to 265° C. for four hours then cooled to room temperature. Again the product was a clear liquid having a viscosity of 11,300 cps at 21° C., an acid value of 0.67, an iodine value of 129.1 and an OH value of 140.6.

The polyols of this invention were then mixed with a polymeric MDI polyisocyanate having an equivalent weight of 133 and cured in the form of sheets for 24 hours at room temperature, followed by 24 hours at 60° C. The ratio NCO/OH was 1.05. The mechanical properties of the cured polyurethanes were then determined. The results are summarized in the following Table I.

TABLE I

MECHANICAL PROPERTIES OF POLYURETHANES

| Polyol of Example | "A" Hardness | Tensile Strength psi | % Elongation |
|---|---|---|---|
| 1 | 92 | 2500 | 110 |
| 2 | 90 | 3775 | 66 |
| 3 | 90 | 2169 | 123 |
| 4 | 92 | 1702 | 138 |
| 10 | 90 | 1693 | 140 |
| 13 | 94 | 2000 | 136 |
| 14 | 90 | 2015 | 132 |
| Castor Oil (control) | 72 | 815 | 103 |

Samples of the cured polyurethane compositions were kept immersed for one week in the following solutions: a 10% solution of $K_2CO_3$ at 100° C., 10% $H_2SO_4$ at 100° C., ethanol at the refluxing temperature of 80° C., and mineral spirits at 100° C.

The results showed that polyurethane compositions containing the polyols of this invention had considerably improved resistance to these solvents as compared to the polyurethane composition containing the unmodified castor oil.

To show that mixtures of present polyols can provide high performance polyurethane compositions, the following tests were conducated. Equal amounts of the graft polyols of Examples 15 and 3, Examples 16 and 3 and Examples 17 and 3 were mixed to provide three combination polyols. These polyols were then cured with a polymeric MDI polyisocanate as described above. The resulting properties of the cured polyurethanes were determined and summarized in Table II, as shown below.

TABLE II

MECHANICAL PROPERTIES OF POLYURETHANES

| Combination Polylol | Hardness | Tensile Strength psi | Percent Elongation |
|---|---|---|---|
| 3,15 | 95 | 501 | 130 |
| 3,16 | 95 | 420 | 83 |
| 3,17 | 95 | 960 | 120 |

These results also show that the polyurethane compositions containing the combination polyols of the invention can be formulated to provide a variety of properties as would be known to one skilled in the art.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

Having thus described our invention what we claim as new and desire to secure by Letters Patent is:

1. A graft polyol comprising the liquid reaction product of:
   (a) at least one unsaturated fatty carbon compound having at least 8 carbon atoms, at least one hydroxyl group, and at least one ethylenic double bond, said compound having other than terminal unsaturation;
   (b) at least one liquid cyclopentadienyl compound; and
   (c) at least one terminally unsaturated monomer having at least one hydroxyl group.

2. The graft polyol according to claim 1 wherein the unsaturated fatty carbon compound is castor oil.

3. The graft polyol according to claim 1 wherein the terminally unsaturated hydroxyl monomer is a monoester of acrylic or methacrylic acid and a diol.

4. The graft polyol acording to claim 1 wherein the terminally unsaturated hydroxyl monomer is allyl alcohol, or an acrylic, methacrylic or crotonic acid monoester of ethylene glycol, propylene glycol, 1–4 butanediol, 1–6 hexanediol, 2,2 dimethyl-1,3-propanediol, 1–4 cyclohexane dimethanol, diethylene glycol, triethylene glycol, dipropylene glycol, or tripropylene glycol.

5. The graft polyol according to claim 1 wherein the terminally unsaturated hydroxyl monomer is allyl alcohol, hydroxyethyl acrylate or hydroxyethyl methacrylate.

6. The graft polyol according to claim 1 wherein the cyclopentadienyl compound is cyclopentadiene, methyl cyclopentadiene, dicyclopentadiene, methyl cyclopentadiene dimer, and mixtures of these compounds or their low molecular weight copolymers.

7. The graft polyol according to claim 1 wherein the unsaturated fatty carbon compound is present in an amount of about 50 to 90 percent, the cyclopentadienyl compound is present in an amount of 5 to 40 weight percent, and the terminally unsaturated hydroxyl monomer is present in an amount of about 1 to 25 weight percent.

8. A graft polyol comprised of about 50 to 90 weight percent castor oil, 5 to 40 weight percent cyclopentadiene or dicyclopentadiene, and 1 to 25 weight percent of hydroxyethyl methacrylate, hydroxyethyl acrylate or allyl alcohol.

9. A process for preparing a graft polyol liquid reaction product which comprises:
   (a) placing (i) at least one unsaturated fatty carbon compound having at least eight carbon atoms, at least one hydroxyl group, and at least one ethylenic double bond, said compound having other than terminal unsaturation (ii) one cyclopentradienyl compound, and (iii) at least one terminally unsaturated hydroxyl monomer in a pressurized reactor to form a mixture; and
   (b) heating this mixture at 250°–275° C. for a sufficient time to form a graft polyol liquid reaction product.

10. The process according to claim 9 which further comprises removing air from the reactor before heating the mixture.

11. The process according to claim 10 which further comprises preheating the mixture from 50° to 150° C. to assist in removal of air from the reactor.

12. The process according to claim 11 which further comprises sparging with nitrogen with or without agitation during the preheating step to assist in the removal of air.

13. A process for preparing a graft polyol liquid reaction product which comprises:
   (a) placing in a pressurized reaction at least one unsaturated fatty carbon compound having at least eight carbon atoms, at least one hydroxyl group, and at least one ethylenic double bond, said compound having other than terminal unsaturation;
   (b) preheating the unsaturated fatty carbon compound;

(c) adding at least one liquid cyclopentadienyl compound and at least one terminally unsaturated hydroxyl monomer to the preheated unsaturated fatty carbon compound to form a mixture; and (d) heating this mixture at 250°–275° C. for a sufficient time to form a graft polyol liquid reaction product.

14. The process according to claim 13 wherein the unsaturated fatty carbon compound is preheated to between 50° and 150° C.

15. The process according to claim 13 wherein the unsaturated fatty carbon compound is preheated to between 250° and 275° C.

16. The process according to claim 13 wherein at least one liquid cyclopentadienyl compound and at least one terminally unsaturated hydroxyl monomer individually or jointly are added to the unsaturated fatty carbon compound by aliquots or continuously.

17. The process according to claim 13 which further comprises removing air from the reactor before heating the mixture.

18. The process according to claim 17 which further comprises sparging with nitrogen with or without agitation during the preheating step to assist in the removal of air.

19. A process for preparing a graft polyol which comprises:
(a) placing castor oil in a pressurized reactor,
(b) adding cyclopentadiene or dicyclopentadiene, and allyl alcohol, hydroxyethyl acrylate or hydroxy ethyl methacrylate to the castor oil to form a mixture; and
(c) heating this mixture at 260°–275° C. for 3 to 4 hours to form a graft polyol.

20. The process according to claim 19 wherein the castor oil is preheated between 50° to 150° C. with nitrogen sparging, and/or agitation to remove air from the reactor.

21. The process according to claim 19 wherein the castor oil is preheated between 250° to 275° C. with nitrogen sparging, and/or agitation to remove air from the reactor.

22. The process according to claim 19 wherein the cyclopentadiene or dicyclopentadiene, and allyl alcohol, hydroxyethyl acrylate, or hydroxy ethyl methacrylate are added individually or jointly to the castor oil by aliquots or continuously.

23. The graft polyol liquid reaction product produced by the process of claim 9.

24. The graft polyol liquid reaction product produced by the process of claim 13.

25. A graft polyol comprising the liquid reaction product of:
(a) about 50 to 90 parts by weight of at least one vegetable oil;
(b) about 5 to 40 parts by weight of at least one liquid cyclopentadienyl compound; and
(c) about 1 to 25 parts by weight of at least one of a monoester of acrylic, methacrylic, or crotonic acid and a diol.

26. A graft polyol comprising the liquid reaction product of:
(a) at least one vegetable oil;
(b) at least one liquid cyclopentadienyl compound; and
(c) at least one of a monoester of acrylic, or methacrylic, or crotonic acid and a diol.

27. The graft polyol of claim 26 wherein the vegetable oil is chinawood oil, soybean oil, dehydrated castor oil, sunflower oil, cottom oil, safflower oil, perilla oil or a synthetic triglyceride.

28. The graft polyol liquid reaction product of claim 1 wherein the fatty carbon compound is ethylene glycol monoricinoleate; butane diol diricinoleate; an alcohol having eight or more carbon atoms and one ethylenic double bond; a polyol mixture produced by ethoxylation of dimer and trimer fatty acids; or an unsaturated hydroxy fatty acid having from eight to eighteen carbon atoms, at least one ethylenic double bond, and at least one hyroxyl group.

29. The graft polyol liquid reaction product produced by the process of claim 19.

30. A process for preparing a graft polyol liquid reaction product which comprises:
(a) placing
  (i) at least one vegetable oil;
  (ii) at least one liquid cyclopentadienyl compound, and
  (iii) at least one of a monoester of acrylic, methacrylic, or crotonic acid and a diol in a pressurized reactor to form a mixture; and
(b) heating this mixture at 250°–275° C. for a sufficient time to form a graft polyol liquid reaction product.

31. The graft polyol liquid reaction product produced by the process of claim 30.

32. A process for preparing a graft polyol liquid reaction product which comprises:
(a) placing at least one vegetable oil in a pressurized reactor;
(b) preheating the vegetable oil
(c) adding at least one liquid cyclopentadienyl compound and at least one of a monoester of acrylic, methacrylic, or crotonic acid and a diol to the preheated vegetable oil to form a mixture; and
(d) heating this mixture at 250°–275° C. for a sufficient time to form a graft polyol liquid reaction product.

33. The graft polyol liquid reaction product produced by the process of claim 32.

34. The graft polyol according to claim 26 wherein the monoester is a monoester of acrylic, methacrylic or crotonic acid and ethylene glycol, propylene glycol, 1-4 butanediol, 1-6 hexanediol, 2,2 dimethyl-1,3-propanediol, 1-4 cyclohexane dimethanol, diethylene glycol, triethylene glycol, dipropylene glycol, or tripropylene glycol.

* * * * *